United States Patent [19]

Shank

[11] Patent Number: 5,088,619
[45] Date of Patent: Feb. 18, 1992

[54] CONTAINERS FOR COMPACT DISCS AND METHOD OF FABRICATION

[76] Inventor: Robert A. Shank, 1733 Beach Dr., SE., St. Petersburg, Fla. 33701

[21] Appl. No.: 588,272

[22] Filed: Sep. 26, 1990

[51] Int. Cl.⁵ .............................................. B65D 1/36
[52] U.S. Cl. .................................. 220/532; 206/504; 206/561; 220/533; 220/23.4; 220/23.83; 312/111
[58] Field of Search ............... 206/387, 504, 562, 563, 206/564, 804, 561; 220/23.2, 23.4, 23.6, 23.83, 532, 533; 211/41, 134, 153; 312/111

[56] References Cited

U.S. PATENT DOCUMENTS

| | | | |
|---|---|---|---|
| 2,225,958 | 12/1940 | Mandel | 312/111 |
| 3,385,643 | 5/1968 | Adell | 206/387 |
| 3,481,485 | 12/1969 | Hess | 211/134 |
| 3,513,984 | 5/1970 | Miller | 211/134 |
| 3,529,878 | 9/1970 | Blowers | 312/111 |
| 3,563,624 | 2/1971 | Stice | 312/111 |
| 3,599,824 | 8/1971 | Pneuman | 220/23.4 |
| 3,856,369 | 12/1974 | Commiant | 220/23.4 |
| 3,988,170 | 10/1976 | Koch et al. | 220/23.4 |
| 4,013,173 | 3/1977 | Snijders | 211/134 |
| 4,121,718 | 10/1978 | Bannister | 211/134 |
| 4,154,492 | 5/1979 | Dunning, III | 211/134 |
| 4,165,908 | 8/1979 | Cooper et al. | 312/111 |
| 4,234,089 | 11/1980 | Morris | 206/561 |
| 4,266,834 | 5/1981 | Ackeret | 206/387 |
| 4,306,655 | 12/1981 | Smith | 206/387 |
| 4,334,359 | 6/1982 | Kump | 312/111 |
| 4,407,411 | 10/1983 | Lowry | 206/561 |
| 4,443,046 | 4/1984 | Hannah | 220/532 |
| 4,577,914 | 3/1986 | Stravitz | 206/387 |
| 4,592,601 | 6/1986 | Hlinsky et al. | 312/111 |
| 4,709,815 | 12/1987 | Price et al. | 206/387 |
| 4,771,887 | 9/1988 | Nehl | 206/804 |
| 4,790,926 | 12/1988 | Mastronardo et al. | 206/387 |
| 4,846,355 | 7/1989 | Price, Sr. et al. | 211/41 |
| 4,889,244 | 12/1989 | Hehn et al. | 206/387 |
| 4,903,451 | 2/1990 | Gresswell | 312/111 |

FOREIGN PATENT DOCUMENTS

| | | | |
|---|---|---|---|
| 155601 | 9/1985 | European Pat. Off. | 206/387 |
| 650182 | 8/1937 | Fed. Rep. of Germany | 211/134 |
| 2220287 | 11/1973 | Fed. Rep. of Germany | 211/134 |
| 2727461 | 1/1979 | Fed. Rep. of Germany | 220/23.4 |
| 1544144 | 9/1968 | France | 220/23.4 |
| 244356 | 9/1946 | Switzerland | 206/561 |
| 248813 | 3/1948 | Switzerland | 220/529 |
| 1125001 | 11/1963 | United Kingdom | 220/23.4 |
| 1188285 | 4/1970 | United Kingdom | 220/23.4 |
| 2120084 | 11/1983 | United Kingdom | 211/153 |

*Primary Examiner*—David T. Fidei

[57] ABSTRACT

An improved container for supporting compact discs in an orientation slightly offset from the horizontal, one above the other, comprising a main body portion having parallel vertical side walls, parallel horizontal upper and lower walls coupled to the side walls along their edges, and a back wall for defining a chamber therewithin; a purality of holes in each of the walls; a plurality of insert panels removably positioned within the chamber with the upper and lower edges of the panels being receivable in recesses formed in the upper and lower walls adjacent to the side walls and with shelves extending inwardly from the panels a predetermined distance for supporting the edges of the compact discs thereon, the shelves being angled with respect to the upper and lower walls of the main body; and dowels receivable in the holes of adjacent containers to removably secure a plurality of containers with respect to each other.

2 Claims, 2 Drawing Sheets

CONTAINERS FOR COMPACT DISCS AND METHOD OF FABRICATION

BACKGROUND OF THE INVENTION

This invention relates to containers for the storing of compact discs and a method of fabrication such containers and, more particularly, to containers for compact discs wherein such containers support the compact discs at predetermined spaced locations wherein a plurality of such containers may be separably coupled one to another and wherein such containers are fabricated of three (3) easily assembled sections.

DESCRIPTION OF THE BACKGROUND ART

In recent years there has been a significant increase in the popularity of music as well as the systems on which such music is played, the mediums on which such music is stored and containers for such mediums. Whether the increasing popularity of music has caused the increase in the use of such systems or whether the availability of systems has allowed the increase in popularity of the music does not matter, players, mediums and containers are, today, found in increasing numbers.

Perhaps the fastest growing medium for sound recordings is the compact disc with the proliferation of compact discs, there has arisen a need for storing and maintaining the individual compact discs in a convenient manner, available for easy identification, selection and retrieved by the user. Such containers should also be designed for accommodating a suitable number of number of compact discs. Further, they should be designed for being conveniently expanded or contracted to accommodate varying quantities of compact discs as the needs of the user vary. In addition, they should be attractive and, possibly most important, they should be as economical as possible to fabricate and assemble.

The patent literature shows that these design objectives are well recognized in the storage arts generally. It does not, however, provide a satisfactory solution, particularly for compact discs. Consider, for example U.S. Pat. No. 3,907,117 to Wolfe where there is disclosed an audio cassette container having angled shelves. U.S. Pat. No. 4,650,072 to Ackert also has an audio cassette with horizontal shelves but wherein the shelves are positionable at variable angles. U.S. Pat. No. 4,453,785 to Smith discloses horizontal shelves without the angling of the shelves but wherein at least a portion of the shelves is replaceably for the storage of different types of cassettes. But perhaps the most pertinent of all is U.S. Pat. No. 4,293,075 to Veralrud which discloses angled shelves for supporting cassettes in a generally horizontal orientation wherein the shelves sides and back, being formed as a single piece for easy insertion and removal.

A wide variety of patent literature discloses generally horizontal shelves for supporting various items such as the compact disks envisioned by the present invention as well as for phonograph records, recordings generally and floppy disks. Note PCT Application PCT W086/03877 dated Dec. 14, 1985 to Ackeret; U.S. Pat. No. 3,069,216 to Azzarri; International Application PCT W086/01334 to Sparing and U.S. Pat. No. 4,640,416 to Northrup. Consider also carriers for vertically disposed materials such as the compact disks of the present invention or floppy disks. Note U.S. Pat. No. 4,655,345 to Drake and U.S. Pat. No. 4,387,802 to Shiring.

As illustrated by the great number of prior patents and commercial devices, efforts are continuously being made in an attempt to more conveniently, economically and attractively store compact discs and to fabricate their containers more conveniently and economically. None of these prior art efforts, however, suggest the present inventive combination of method step and component elements arranged and configured as disclosed and claimed herein. Prior techniques and apparatus do not provide the benefits attendant with the present invention. The present invention achieves its intended purposes, objectives and advantages over the prior art devices through a new, useful and unobvious combination of method steps and component elements, through the use of a minimum number of functioning parts, at a reduction in cost to manufacture, and through the utilization of only readily available materials.

It is, therefore, an object of the present invention to provide an improved container for supporting compact discs in an orientation slightly offset from the horizontal, one above the other, comprising a main body portion having parallel vertical side walls, parallel horizontal upper and lower walls coupled to the side walls along their edges, and a back wall for defining a chamber therewithin; a plurality of holes in each of the walls; a plurality of insert panels removably positioned within the chamber with the upper and lower edges of the panels being receivable in recesses formed in the upper and lower walls adjacent to the side walls and with shelves extending inwardly from the panels a predetermined distance for supporting the edges of the compact discs thereon, the shelves being angled with respect to the upper and lower walls of the main body; and dowels receivable in the holes of adjacent containers to removably secure a plurality of containers with respect to each other.

It is a further object of the invention to provide an improved method of fabricating a compact disc container including the steps of injection molding a main body portion having vertically disposed parallel side walls and horizontally disposed parallel upper and lower walls coupled at their edges, and a rear wall coupling the rear edges of the side, upper and lower walls; injection molding a plurality of vertically disposed side panels with inwardly directing supporting ledges for compact discs, such ledges being angled with respect to the upper and lower edges of their side panel; drilling holes in the upper, lower and side walls; and sliding the side panels into the opening of the main body portion with the upper and lower edges of the side panels positionable in parallel recesses in the upper and lower walls adjacent to the side walls to thereby provide bottoming surfaces for the holes of the side walls and to thereby provide supports for the compact discs.

It is a further object of the invention to support compact discs in an orderly, symmetric manner to facilitate the identification, insertion and removal of compact discs with respect thereto.

It is yet a further object of this invention to conveniently couple and uncouple together any number of compact disc containers in any of a variety of attractive configurations.

Lastly, it is an object of the present invention to economically fabricate and assemble compact disc containers.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and advantages as well as a fuller understanding of the invention may be had by referring to the summary and detailed description of the preferred embodiments of the invention in addition to the scope of the invention as defined b the claims taken in conjunction with the accompanying drawings.

SUMMARY OF THE INVENTION

The present invention is defined by the appended claims with the specific preferred embodiments shown in the attached drawings. For the purposes of summarizing the invention, the invention may be incorporated into an improved container for supporting compact discs in an orientation slightly offset from the horizontal, one above the other, comprising a main body portion having parallel vertical side walls, parallel horizontal upper and lower walls coupled to the side walls along their edges, and a back wall for defining a chamber therewithin; a plurality of holes in each of the walls; a plurality of insert panels removably positioned within the chamber with the upper and lower edges of the panels being receivable in recesses formed in the upper and lower walls adjacent to the side walls and with shelves extending inwardly from the panels a predetermined distance for supporting the edges of the compact discs thereon, the shelves being angled with respect to the upper and lower walls of the main body; and dowels receivable in the holes of adjacent containers to removably secure a plurality of containers with respect to each other.

Further, the invention may be incorporated into an the side panels include an upper most ledge positionable above the upper most compact disc within the container. The upper most ledge is triangular in shape with its point located adjacent to the open edge of the chamber and its remote edge located adjacent to the back wall. The holes in the walls of the container are in a predetermined pattern and the dowels are positionable within the holes for the removable coupling of a plurality of containers with respect to each other in any one of a plurality of configurations. The walls are all rectangular and wherein each wall has four holes with each wall being located from its adjacent wall a distance equal to one fourth the length of each wall.

The invention may also be incorporated into a container for supporting compact discs in an orientation slightly offset from the horizontal, one above the other, comprising a main body portion having parallel vertical side walls, parallel horizontal upper and lower walls coupled to the side walls along their edges, and a back wall for defining a chamber therewithin; holes in each of the walls, the holes in the walls of the container being in a predetermined pattern with the dowels being positionable within the holes for the removable coupling of a plurality of containers with respect to each other in any one of a plurality of configurations; a pair of insert panels removably positioned within the chamber with the upper and lower edges of the panels being receivable in recesses formed in the upper and lower walls adjacent to the side walls and with shelves extending inwardly from the panels a predetermined distance for supporting the edges of the compact discs thereon, the shelves being angled with respect to the upper and lower walls of the main body, the side panels including an upper most ledge positionable above the upper most compact disc within the container, the upper most ledge being triangular in shape with its point located adjacent to the open edge of the chamber and its remote edge located adjacent to the back wall; and dowels receivable in the holes of adjacent containers to removably secure a plurality of containers with respect to each other. The walls are all rectangular and wherein each wall has is holes located from its adjacent wall a distance equal to one fourth the length of each wall. The edges of side walls have lateral extensions receivable in lateral recesses of the main body portion for grater stability.

Lastly, the invention may also be incorporated into a method of fabricating a compact disc container including the steps of: injection molding a main body portion having vertically disposed parallel side walls and horizontally disposed parallel upper and lower walls coupled at their edges, and a rear wall coupling the rear edges of the side, upper and lower walls; injection molding a plurality of vertically disposed side panels with inwardly directing supporting ledges for compact discs, such ledges being angled with respect to the upper and lower edges of their side panel; drilling holes in the upper, lower and side walls; and sliding the side panels into the opening of the main body portion with the upper and lower edges of the side panels positionable in parallel recesses in the upper and lower walls adjacent to the side walls to thereby provide bottoming surfaces for the holes of the side walls and to thereby provide supports for the compact discs. The holes of the side walls extend therethrough while the holes of the other walls extend to only a predetermined distance therein.

The foregoing has outlined rather broadly the more pertinent and important features of the present invention in order that the detailed description of the invention that follows may be better understood whereby the present contribution to the art may be fully appreciated. Additional features of the invention will be described hereinafter which form the subject of the claims of the present invention. It should be appreciated by those skilled in the art that the conception and the disclosed specific embodiment disclosed herein may be readily utilized as a basis for modifying or designing other methods or apparatus for carrying out the same purposes of the present invention. It should also be realized by those skilled in the art that such equivalent methods and apparatus do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings.

Similar reference numerals refer to similar parts throughout the several Figures.

DETAILED DESCRIPTION OF THE INVENTION

Figure 1:
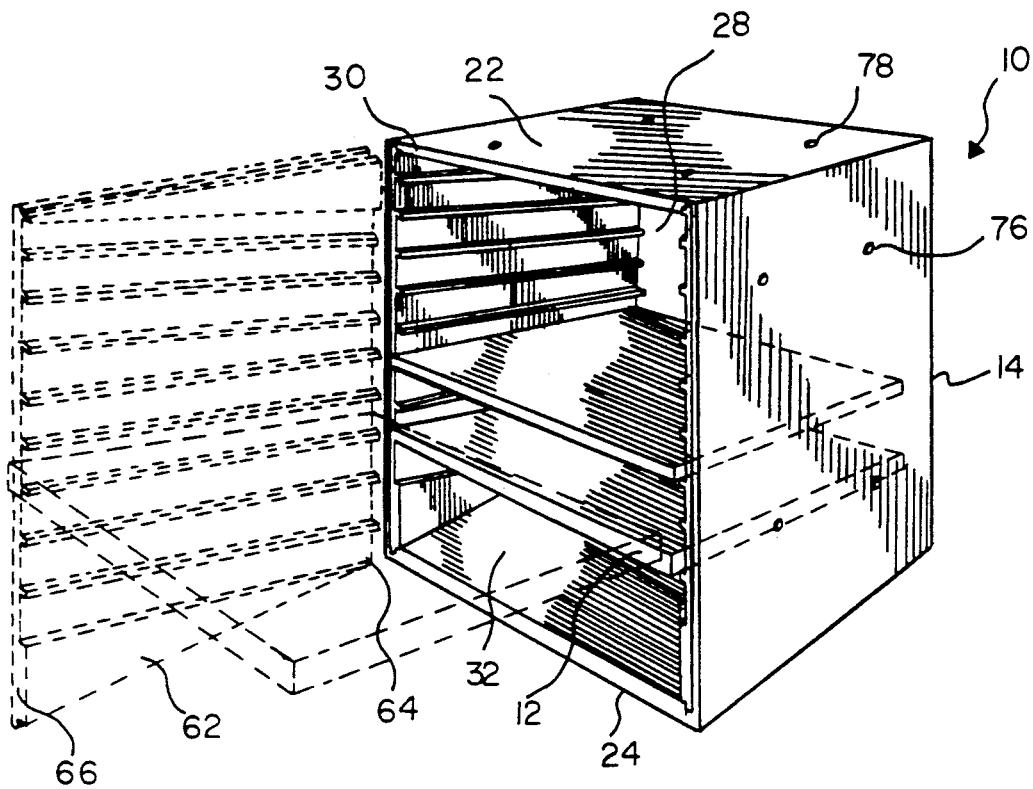
FIG. 1 is a perspective illustration of the compact disc storage assembly constructed in accordance with the principles of the present invention.
Figure 2:
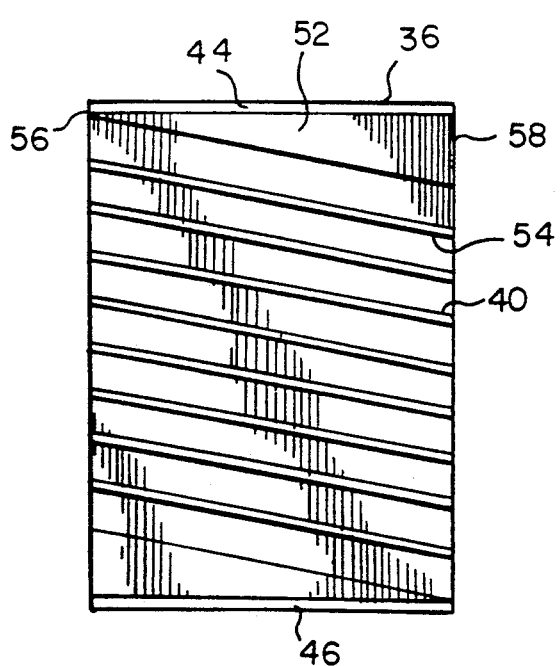
FIGS. 2 and 3 are plan views of the side panels shown in FIG. 1.
Figure 3:
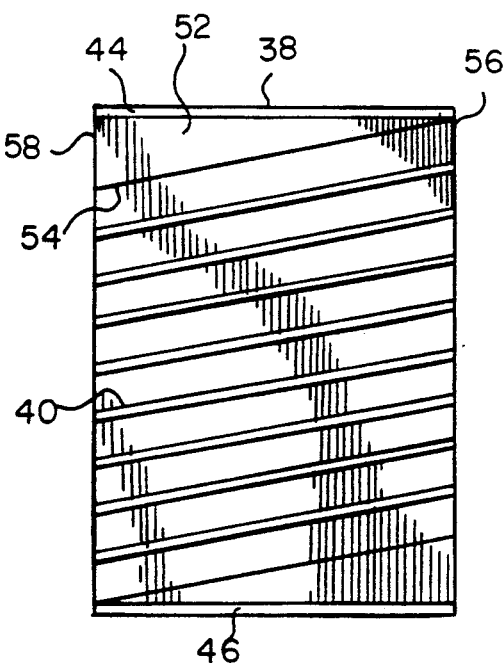

Shown in the Figures, with particular reference to FIG. 1 there is illustrated a container assembly 10 for the removable storage of compact discs 12. The container of these Figures is constructed in accordance with the primary embodiment of the invention and includes a main body portion 14 formed with a pair of vertically disposed side walls 16 and 18 spaced from each other at a predetermined distance slightly greater than the width of the cassette to be received. The main body portion 10 also includes a pair of upper and lower walls 22 and 24, parallel with respect to each other and generally perpendicular to the side walls. A back face 28 is integrally formed with the horizontally and vertically disposed walls at their rear edges. The entire structure is of a size to horizontally receive therein a plurality of vertically spaced compact discs, parallel with each other in a generally horizontal orientation. The front edges 30 of the walls constitute an opening within the main body portion and form a recess or chamber 32 of the appropriate size and configuration.

Positionable within the chamber 32 are the pair of vertically disposed parallel side panels 36 and 38, each having short, inwardly extending shelves 40 for the receipt and support of stored compact discs 12 at their edges. The side panels 36 and 38 are positionable adjacent to, and parallel with, the side walls 16 and 18 of the main body portion 14. Their plurality of ledges or shelves 40 are spaced a predetermined distance into the container with each ledge being parallel to, and aligned with, a mating ledge on the opposite side panels.

Figure 4:
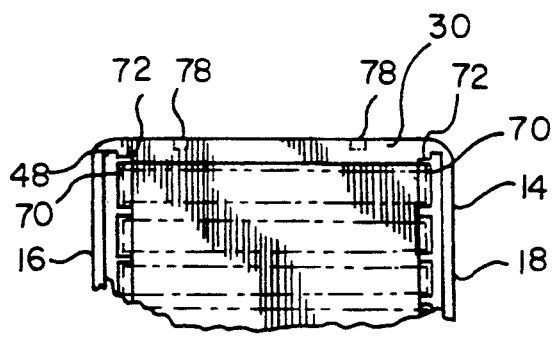
FIG. 4 is an enlarged plan view of an edge of a side panel and a corner of the main body portion coupled together.
Figure 5:
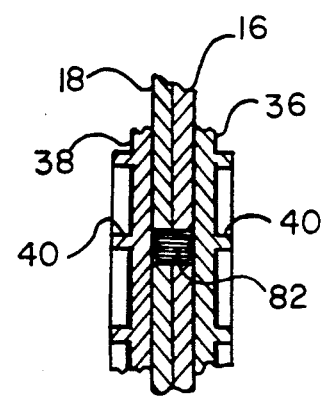
FIG. 5 is an enlarged sectional view of a portion of two adjacent assemblies coupled together.

The upper and lower horizontal edges 44 and 46 of the panels are generally rectangular in configuration and are adapted to be received in mating vertically grooves 48 in the upper and lower panels adjacent to the side panels. In this manner the panels may be readily slid into position within the recesses for being securely positioned to constitute container assemblies for the receipt of compact discs on the ledges as shown in FIG. 4. The ledges extend inwardly a distance sufficient to retain the compact discs in position regardless of any side movement of the cassettes within the assembled container. The components of the containers are molded to relatively precise tolerances so that the panel edges may be press fit into the grooves. Glue may be added, if desired, to further secure together the component elements.

As can be seen in FIG. 1, the depth of the container is such that a small portion of each compact disc will extend to exterior of the container for easy manipulation of the stored cassettes as may be needed for their retrieval. The thickness of the ledges and their spacing with respect to each other are such that any inadvertent movement of the container will allow only a minimum amount of displacement of the stored container to preclude damage during movement.

Note is taken that the upper most ledge 52 is not really a supporting ledge upon which a compact disc may rest. It is, rather, a restraint to preclude possibly damaging upward movement of the compact disc in the top most shelf in the event of inadvertent movement of the container. The upper most restraint is of a triangular configuration with its lower most edge 54 parallel with the edges of the other ledges and with its front edge 56 forming a line at the front of the chamber. Its remote edge 58 is a vertical rectangular plane at the rear edges of the container walls at the back face. Its exterior edge includes a lateral projection 70 which is slidably fitted in a stepped extension in the upper and lower walls of the main body portion constituting mating recess extension 72 of the main body portion at each corner for greater stability.

In a similar manner, note is taken that the lower most ledge is also formed as a triangle 62. The forward most edge 64 comes to a line, a point when viewed from the side. The rearward most surface is a verticle flat surface and, when in operative position, lies adjacent to the back face of the container. The upper most surface of the triangle 62 is angled parallel with the other ledges while its lower most surface is horizontal.

Figure 6:
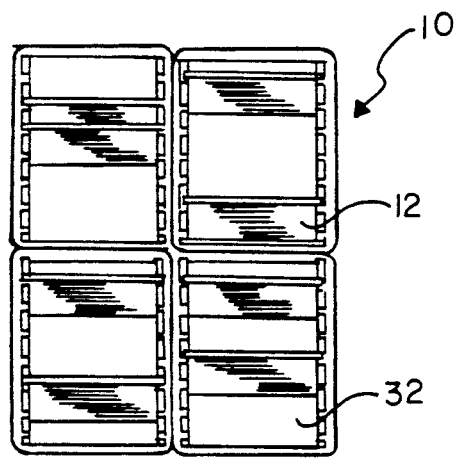
FIGS. 6, 7 and 8 are various illustrations of pluralities of compact disc containers coupled together in accordance with the invention.
Figure 7:
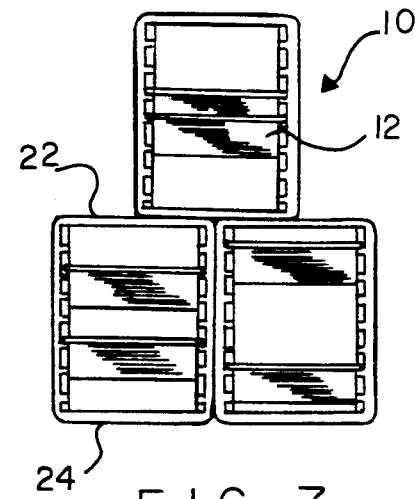
Figure 8:
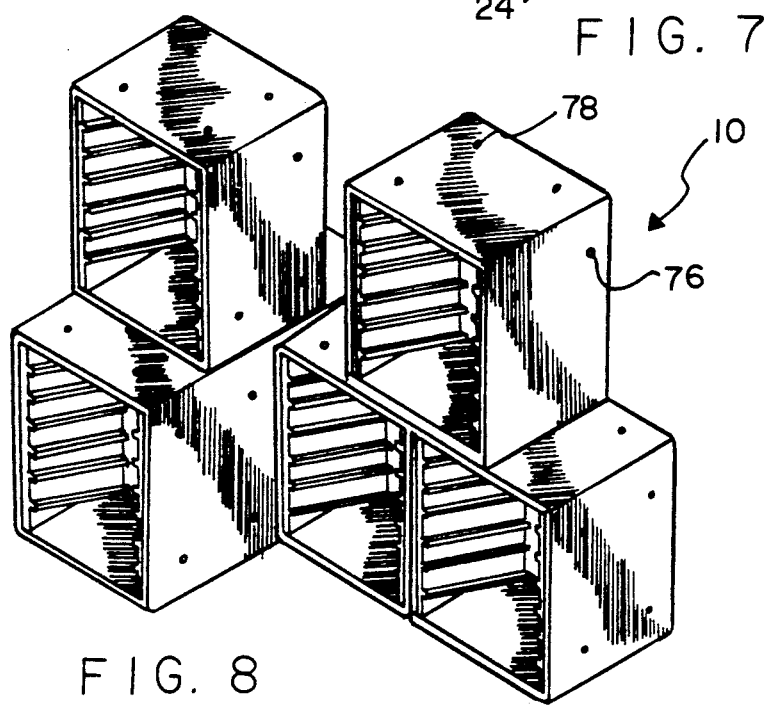

Retention of plurality of containers in a grid-like fashion is accomplished through the drilling of holes 76 and 78 in proper spaced orientation such as the four rectangularly positioned holes disclosed in the various figures. The holes are drilled in the vertical side walls and the horizontal upper and lower walls. The drilling of holes must be done in a pattern, preferable through a conventional template, not shown, which would be common to all four sides. It should be noted that the drilling of the holes 76 is done through the entire surface of the main body portion. In such case the inserted side panels will limit the depth of insertion of the dowels for proper maintenance of the plurality of containers with respect to each other. The holes 78 of the horizontal walls only extend inwardly to a predetermined depth, half the length of the dowels. The drilled holes allow for the use of dowels 82 of a diameter essentially equal to the diameter of the holes in the side panels as will as upper and lower panels for the convenient coupling and separation of the containers one with respect to the other in a plurality of patterns for enhanced esthetic appearance. Note FIGS. 6, 7 and 8. The symmetric positioning of the hole allows for greater flexibility in removably securing the containers with respect to each other. Each hole is located inwardly from its adjacent edges a distance equal to one fourth the length of such wall.

In the fabrication of the device of the present invention, the entire assemblage of parts may be injection molded. The injection molding would require the three (3) separate molds. One for the main body portion 14, one for the left panel 36 and one for the right panel 38 inasmuch as they are of a different design. The panels are, however, similar in construction, their shapes being mirror images of each other.

After being molded, holes 76 are drilled through the side panels in the desired configuration and pattern as illustrated in the various figures preferably through a template. The drills extend the entire distance through the side walls so that the limiting of the depth of penetration need not be a concern. Holes 78 are also drilled in a similar pattern on the upper and lower surfaces of the upper and lower walls. In such situation, the holes extend only a predetermined distance into the material since the inserted panels will not be available to limit the depth of penetration of the dowels.

Assembly of the component elements of the container assembly is then effected by sliding the side panels 36 and 38 into the grooves of the upper and lower walls to complete the construction of each assembly. The assembled containers may then be placed together in sideby-side or upper and lower configurations, as is desired, for the appropriate aesthetic appearance of the cassette containers as well as for the aesthetic appearance of the assembled containers. Note in FIGS. 6, 7 and 8 various arrangements for coupling containers.

The preferred molding material is a transparent acrylic to provide a rigid construction. The transparency allows for better viewing of writing, pictures or other indicia on the surface of the cassette or its transparent containers. A wide variety of other plastic materials with similar properties could readily be utilized.

The present disclosure includes that contained in the appended claims as well as that of the foregoing description. Although this invention has been described in its preferred forms or embodiments with a certain degree of particularity, it is understood that the present disclosure of the preferred form has been made only by way of example that and numerous changes in the details of construction, fabrication and use including the combination and arrangement of method steps and parts, may be resorted to without departing from the spirit and scope of the invention.

Now that the invention has been described,
What is claimed is:

1. A container for supporting compact discs in an orientation slightly offset from the horizontal, one above the other, comprising:

a main body portion having parallel vertical side walls, parallel horizontal upper and lower walls coupled to the side walls along their edges, and a back wall for defining a chamber therewithin with recesses within the upper and lower walls adjacent to the side walls, the recesses extending the entire depth of the chamber, the recesses including extensions formed by stepped lateral extensions in the upper and lower walls of the main body portion for greater stability; and a pair of rectangular, injection molded insert panels, each removably positioned within the chamber with the upper and lower edges of the panels being receivable in the recesses with the faces of the insert panels in sliding contact with the faces of the recesses and the side walls of the main body portion and with separate shelves extending into the chamber from the panels a predetermined distance for supporting the edges of the compact discs thereon, the shelves being essentially horizontally oriented but slightly angled with respect to the upper and lower walls of the main body portion, the shelves being of a length to extend between the back wall and the open edge of the chamber, the side panels including an upper most ledge positionable above the upper most compact disc within the container, the upper most ledge being triangular in shape with its point located adjacent to the open edge of the chamber and its remote edge located adjacent to the back wall, the lowermost edge positionable beneath the lowermost compact disc in the container, the lowermost edge being triangular in shape with its point located adjacent to the back wall of the chamber and its forward edge located adjacent to the opening edge of the chamber.

2. The apparatus as set forth in claim 1 and further including holes in each of the walls, the holes being in a predetermined pattern for the receipt of dowels positionable within the holes for the removably coupling of a plurality of containers with respect to each other in any one of a plurality of configurations.

* * * * *